United States Patent
Jones et al.

(10) Patent No.: US 10,354,476 B2
(45) Date of Patent: *Jul. 16, 2019

(54) PRODUCT VENDING AND TUBE DELIVERY SYSTEM FOR DELIVERING PRODUCTS TO REMOTE CONSUMERS

(71) Applicant: Jayce Jones, Little Rock, AR (US)

(72) Inventors: Jayce Jones, Little Rock, AR (US); Ivan Pena, Danville, AR (US); Eric Jones, Russellville, AR (US)

(73) Assignee: Jayce Jones, Little Rock, AR (US)

( * ) Notice: Subject to any disclaimer, the term of this patent is extended or adjusted under 35 U.S.C. 154(b) by 259 days.

This patent is subject to a terminal disclaimer.

(21) Appl. No.: 15/070,725

(22) Filed: Mar. 15, 2016

(65) Prior Publication Data

US 2016/0196709 A1    Jul. 7, 2016

Related U.S. Application Data

(63) Continuation-in-part of application No. 14/887,575, filed on Oct. 20, 2015.

(60) Provisional application No. 62/122,913, filed on Nov. 3, 2014.

(51) Int. Cl.
| | |
|---|---|
| G07F 11/62 | (2006.01) |
| G07F 11/16 | (2006.01) |
| G06Q 20/20 | (2012.01) |
| G06Q 20/18 | (2012.01) |

(Continued)

(52) U.S. Cl.
CPC ............ *G07F 11/16* (2013.01); *G06Q 20/18* (2013.01); *G06Q 20/202* (2013.01); *G06Q 30/0641* (2013.01); *G07F 11/62* (2013.01); *G07F 17/0071* (2013.01)

(58) Field of Classification Search
USPC .............................. 221/1; 186/55; 705/21, 22
See application file for complete search history.

(56) References Cited

U.S. PATENT DOCUMENTS

| | | | | |
|---|---|---|---|---|
| 5,586,686 | A * | 12/1996 | Bustos | E04H 3/02 186/55 |
| 2013/0112702 | A1 * | 5/2013 | Roekens | A47F 3/0486 221/1 |

(Continued)

OTHER PUBLICATIONS

Website, http://www.insightdigitalsignage.com/sites/default/files/gas-pump-top-sign1.JPG (last visited Nov. 2, 2014).

(Continued)

*Primary Examiner* — Fahd A Obeid
*Assistant Examiner* — Reva R Danzig
(74) *Attorney, Agent, or Firm* — Richard Blakely Glasgow

(57) ABSTRACT

A system and method for delivering a desired product or products to a remote consumer using a product vending and tube delivery system capable of delivering selected products from a business to the remote consumer. A selector coupled to the product vending machine removes the selected products from designated compartments inside the vending machine and deposits the product either into a pneumatic tube or a canister inside a non-pneumatic tube. The product is then delivered through the tube to a remote consumer. The system is capable of delivering multiple products to multiple consumers in a short period of time with little to no human intervention.

13 Claims, 7 Drawing Sheets

(51) Int. Cl.
*G06Q 30/06* (2012.01)
*G07F 17/00* (2006.01)

(56) References Cited

U.S. PATENT DOCUMENTS

| 2014/0224826 A1* | 8/2014 | Otzen | G07F 11/165 |
| | | | 221/1 |
| 2017/0137228 A1* | 5/2017 | Kyotani | B65G 21/22 |

OTHER PUBLICATIONS

Website, http://i.ytimg.com/vi/ftUTU6Y7Fpk/maxresdefault.jpg (last visited Nov. 2, 2014).
Wikipedia, http://en.wikipedia.org/wiki/Pneumatic_tube (last visited Nov. 2, 2014).
Website, http://newlaunches.com/wp_content/uploads/2012/06/giant-vending-machine-4.jpg (last visited Nov. 2, 2014).
Website, http://foleyphotography.co.uk/wp-content/uploads/2013/11/Moet-Chandon-vending-machine-Selfridges(pp_w639_h439).jpg (last visited Nov. 2, 2014).

* cited by examiner

PRODUCT VENDING AND TUBE DELIVERY SYSTEM FOR DELIVERING PRODUCTS TO REMOTE CONSUMERS

CROSS-REFERENCE TO RELATED APPLICATIONS

This application is a continuation-in-part application of U.S. patent application Ser. No. 14/887,575, filed on Oct. 20, 2015, entitled "Product Vending and Pneumatic Tube Delivery System for Delivering Products to Remote Consumers," which claims the benefit of U.S. Provisional Patent Application No. 62/122,913, filed on Nov. 3, 2014, and entitled "'Inside-Out' refreshment system," said applications incorporated herein by reference in their entirety.

STATEMENT REGARDING FEDERALLY SPONSORED RESEARCH OR DEVELOPMENT

Not applicable

BACKGROUND OF THE INVENTION

The present invention relates generally to a product delivery system. More specifically, the present invention relates to a system and method for delivering selected products from a retail location to a remote consumer using a product vending machine and a tube delivery system.

With the advancements that have been made (and are continually being made) in technology, consumers have become increasingly reliant on instant gratification. The emergence of email and text messaging pioneered this movement, allowing people to communicate instantly with others. As the capabilities of these technologies have increased, through use of smartphones and similar mobile devices, consumers have become accustomed to instant gratification at the push of a button. Things are no different when it comes to customer service, as busy, multi-tasking consumers expect to be served efficiently and without hesitation. Often times requiring consumers to deal with a human counterpart, whether a cashier or some other customer service agent, tends to slow down the purchasing process. Technologies like "self-check-out" lines have been developed to help cure this block to instant gratification.

It is desired to create an invention that takes a consumer's need for instant service further, and to create a system that both meets a consumer's expectations and also creates a revenue stream for businesses. The present invention addresses these goals by providing instant service to remote consumers.

BRIEF SUMMARY OF THE INVENTION

The present invention relates generally to a product delivery system. More specifically, the invention relates to a product vending and tube delivery system that is capable of delivering selected products to remote consumers.

It is an object of the present invention to provide consumers a means of purchasing and receiving desired products from a remote location. For purposes of describing the invention, non-limiting examples of uses of the present invention may be used, but it is understood that the present invention is capable of use by a variety of consumers for purchasing a variety of products offered by a variety of businesses. For example, one embodiment of the present invention may be described as being used at a gas station and convenience store, where the remote consumer is purchasing fuel at a fuel island but is interested in purchasing a cold beverage from inside the convenience store. In one embodiment, it is an object of the present invention to allow the remote consumer to purchase the cold beverage without requiring the consumer to leave the fuel island and go inside the store. It is understood, however, that the present invention is capable for use in any number of businesses, including without limitations, airports, hotels, or any other business that aims to sell products to a consumer. The present invention is also capable of use in non-retail store applications, such as in product distribution facilities.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
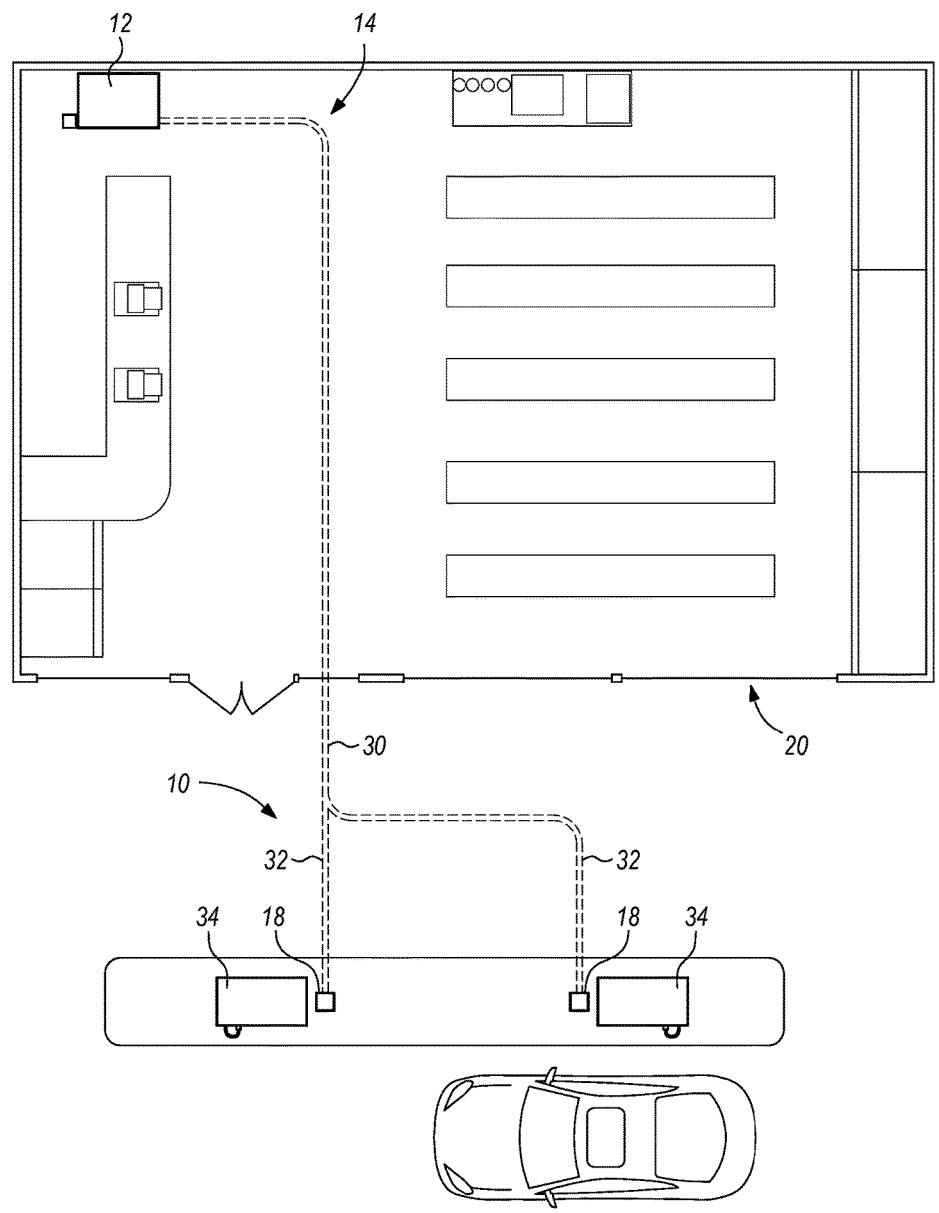
FIG. 1 is a top view of one embodiment of the product vending and tube delivery system of the present invention.

In one embodiment the present invention is directed to a product vending and tube delivery system 10 capable of delivering a selected product or multiple products 36 to a remote consumer. As shown in FIG. 1, the product vending and tube delivery system 10 preferably includes a product vending machine 12, a product delivery system 14, a consumer purchasing interface 16, and a product receptacle 18.

Figure 2:
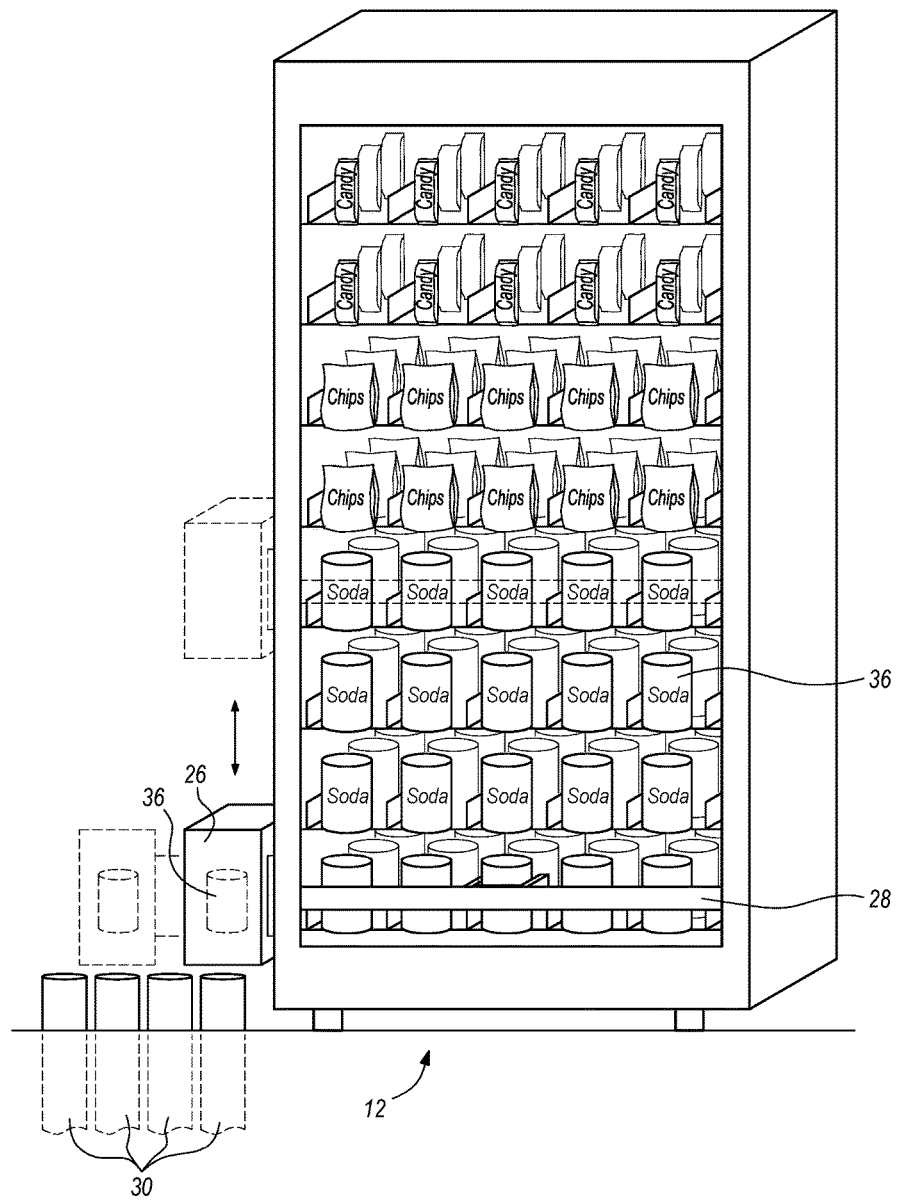
FIG. 2 is a perspective view of one embodiment of the product vending machine and product delivery system of the present invention.
Figure 3:
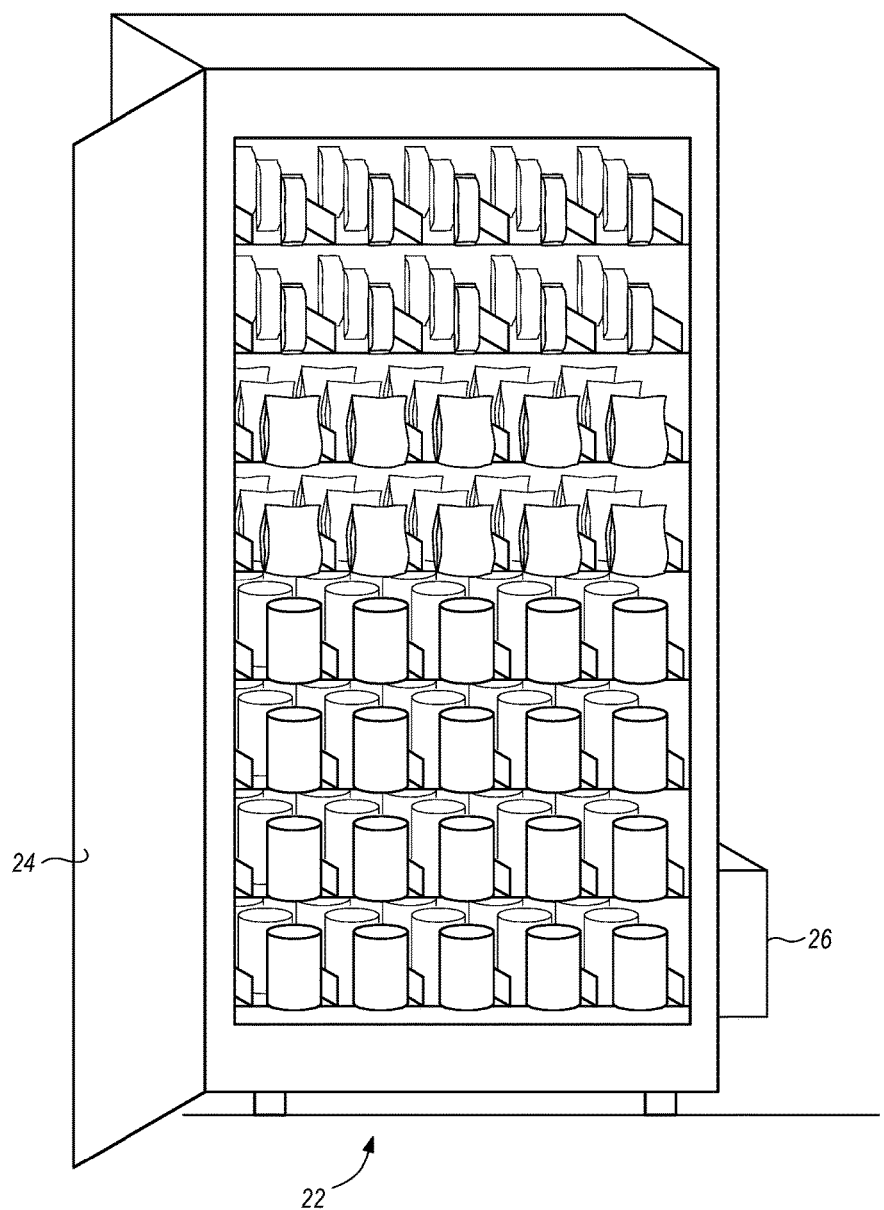
FIG. 3 is a perspective view of the back of the product vending machine of the product vending and tube delivery system of the present invention.

Turning to FIGS. 1-3, the product vending machine 12 of the system can generally be described. In one embodiment, the product vending machine 12 would be located inside of the business 20. The product vending machine 12 is designed such that it can be placed in a discrete location in the business 20, so that it is not visible to consumers. In one embodiment, the product vending machine 12 is hung from the ceiling of the business 20, so that it does not take up valuable retail space on the floor. Preferably, the product vending machine 12 would only need to be physically accessed by a person when it is necessary to restock items.

FIGS. 2-3 describes the product vending machine 12 of the system in greater detail. In one embodiment the product vending machine 12 has a large storage unit 22 capable of storing a large number of items. For example, the storage unit 22 may be a 7 foot by 3 foot rectangular box or some other storage structure. In one embodiment, the internal compartment of the storage unit 22 is preferably divided into a number of rows and into a number of columns to create a number of product storage compartments, each compartment stocked with a unique product 36. In one embodiment, a top selling product 36 may be found in multiple storage compartments as to keep up with consumer demand. For example, one compartment may be stocked with a cold beverage, a second row may be stocked with bags of chips, and a third row may be stocked with a candy bar. In different embodiments, the entire storage unit 22, a portion of the storage unit 22, or individual product compartments may be refrigerated to keep certain products cold. Alternatively, at certain businesses the storage unit 22 itself could be placed in an existing refrigerated cooler to achieve this goal.

In order for an employee to restock the vending machine's storage unit 22, the product storage compartments must be accessible. As shown in FIG. 3, in one embodiment, each row of product is accessible from the side or rear of the storage unit 22 by means of an access panel 24 so that items can be restocked into the machine. Alternatively, the front of the vending machine's storage unit 22 may be hinged to the storage unit 22 so that it is capable of being opened in a swing-away manner so that the employee can restock the compartments from the front of the storage unit 22. In one embodiment, the front of the vending machine's storage unit 22 would be a see-through material like plexi-glass so that machine technicians and other employees could see inside of the machine.

As shown in FIG. 2, a product selector 26 is coupled to the storage unit 22. In one embodiment, the product selector 26 is capable of moving along the storage unit 22 both lengthwise and widthwise, via a rail system 28, in order to access every product stored in the storage compartments of the storage unit 22. In one embodiment, the rail system 28 would be located on the front swing-away door of the machine's storage unit 22 to allow machine technicians to access the selector 28 in case of malfunction. As the remote consumer selects a desired product 36 (described in more detail below), a computer operates the product selector 26 such that the selector 26 moves along the length and width of the storage unit 22 to the appropriate product storage compartment (i.e. the compartment corresponding to the product 36 or item the consumer chose). After reaching the compartment corresponding to the product 36 or item chosen, the selector 26 lines itself up in front of the desired product 36. Then, in one embodiment, a screw-type mechanism slowly turns to push the product 36 from the compartment, such that the product 36 falls into the selector 26. Alternatively, the selector 26 may pull the product 36 from the compartment. In one embodiment, a flap is positioned between the product storage compartments and the selector 26 in order to keep an airtight seal on the inside of the storage unit 22. The selector 26 is capable of lifting the flap in order to retrieve the desired product 36.

In an alternative embodiment, the product selector 26 includes a robotic arm contained within the storage unit 22. The robotic arm may be of the type well-known to those skilled in the art. The inner side walls of the storage unit 22 include grooves that extend from the top of the storage unit 22 to the bottom of storage unit 22. One or more rods are received and are moveable within the grooves. The rods extend along the width of the storage unit 22. The robotic arm is attached to rods. The rods and the attached robotic arm are in communication with a power source of a type well-known to those skilled in the art, such as a 120-volt system. As the rods are moved within the grooves from the top to the bottom of the storage unit 22 and vice versa, the robotic arm is also moved up-and-down. As a result, the robotic arm has access to each of the rows of products 36. When the desired product 36 is within reach, the robotic arm extends out and grasps the desired product 36. The robotic arm then deposits the product 36 directly into the tube 30 or canister 38. In embodiments where a canister is utilized, the robotic arm also closes the door of the canister after depositing the product 36 into the canister. The robotic arm includes a SKU scanner that scans each product 36 that is retrieved from the storage unit 22 and deposited into the tube 30 or canister 38. The SKU scanner is in electronic communication with a point-of-sale or inventory system, which alerts the operator of product vending and tube delivery system 10 in real time when restocking of the products 36 in the storage unit 22 is needed.

In one embodiment, the selector 26 is capable of holding only one product. After retrieving the selected product 36, the selector 26 moves to a tube 30 (described below) corresponding to the particular consumer who purchased that product 36 and deposits the product into the tube 30. If the product delivery system is a pneumatic system, then it may be necessary for the selector 26 to make a seal with the tube 30 before the product 36 is delivered to the tube 30. If additional products are selected by the same consumer, the selector 26 then moves to the compartment corresponding to the additional product, pulls the additional product, and drops the additional product into the appropriate tube 30. This process repeats for every additional product purchased by that consumer. Once that consumer's purchase has been completed and all products delivered, the selector 26 begins to fulfil the order of a different consumer. The selector 26 is preferably capable of completing a consumer's order in a very short period of time in order to reduce the amount of time a consumer must wait for the selected product 36. For example, in one embodiment, if a consumer pumping gas were to purchase a cold beverage and a bag of chips, the selector would be capable of pulling and depositing the products 36 into the appropriate tube 30 all before the consumer is finished pumping gas.

In an alternate embodiment, the selector 26 is capable of retrieving and transporting multiple products 36 simultaneously. In this embodiment, the selector 26 first moves to the compartment of the storage unit corresponding to the first product and retrieves the first product, moving that product into a selector holding unit, and then the selector 26 moves to the compartment corresponding to the second product, pulls the second product, and moves that product into the selector holding unit. Once all of the products for that order are pulled, or the selector holding unit becomes full, the selector 26 moves to the appropriate tube 30 and deposits the products from the selector holding unit into that tube 30 to be delivered to the appropriate consumer. The selector 26 is capable of instantaneously determining load capacity based on the size of the items in the order it is processing. This load capacity will determine how many trips the selector 26 must take.

Figure 4:
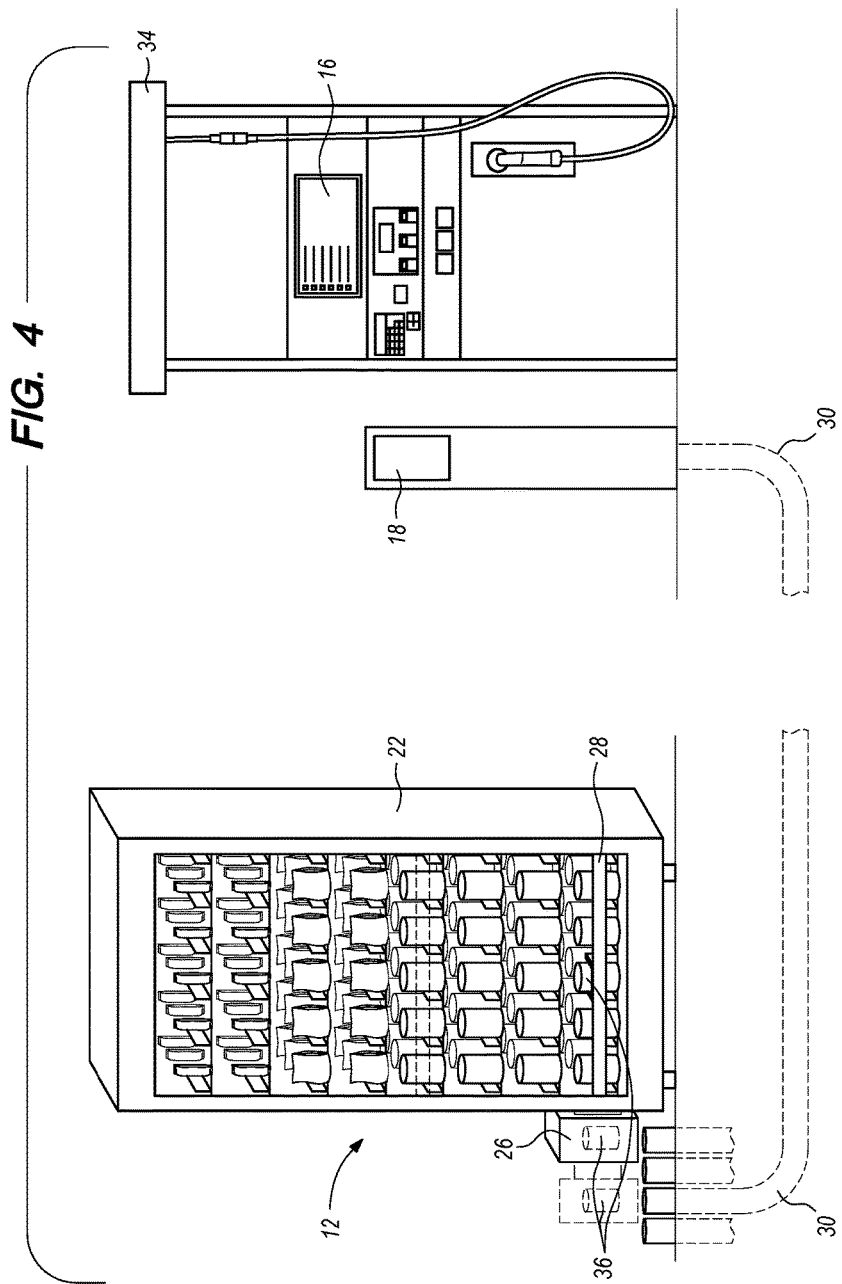
FIG. 4 is a perspective view of the product vending machine, product delivery system, product receptacle, and consumer purchasing interface of the product vending and tube delivery system of the present invention.

Turning to FIGS. 1-2 and 4, the product delivery system 14 can be described. In one embodiment, the product delivery system 14 is preferably a pneumatic tube delivery system, which is primarily made of a tube 30 that transports the selected products 36 from the product vending machine 12 (as described above) to the remote consumer who purchased those products 36. The pneumatic tube delivery system is preferably of the type well-known to those skilled in the art which moves objects by air. Different size tubing may be used depending on the size of products being offered. For example, in one embodiment the tube 30 may be a 6-inch diameter tube. Alternatively, if a larger product is offered, the system may use 8-inch diameter tubes. The invention may be implemented in new construction products, where the tubes may be placed in the ground, or the invention may be retrofitted to existing spaces, where the tubes are capable of being placed in the ceiling to avoid taking up space. For example, an existing gas station that desires to use the present invention may retrofit the tubes to run along the existing canopy that covers the fueling area.

Figure 6:
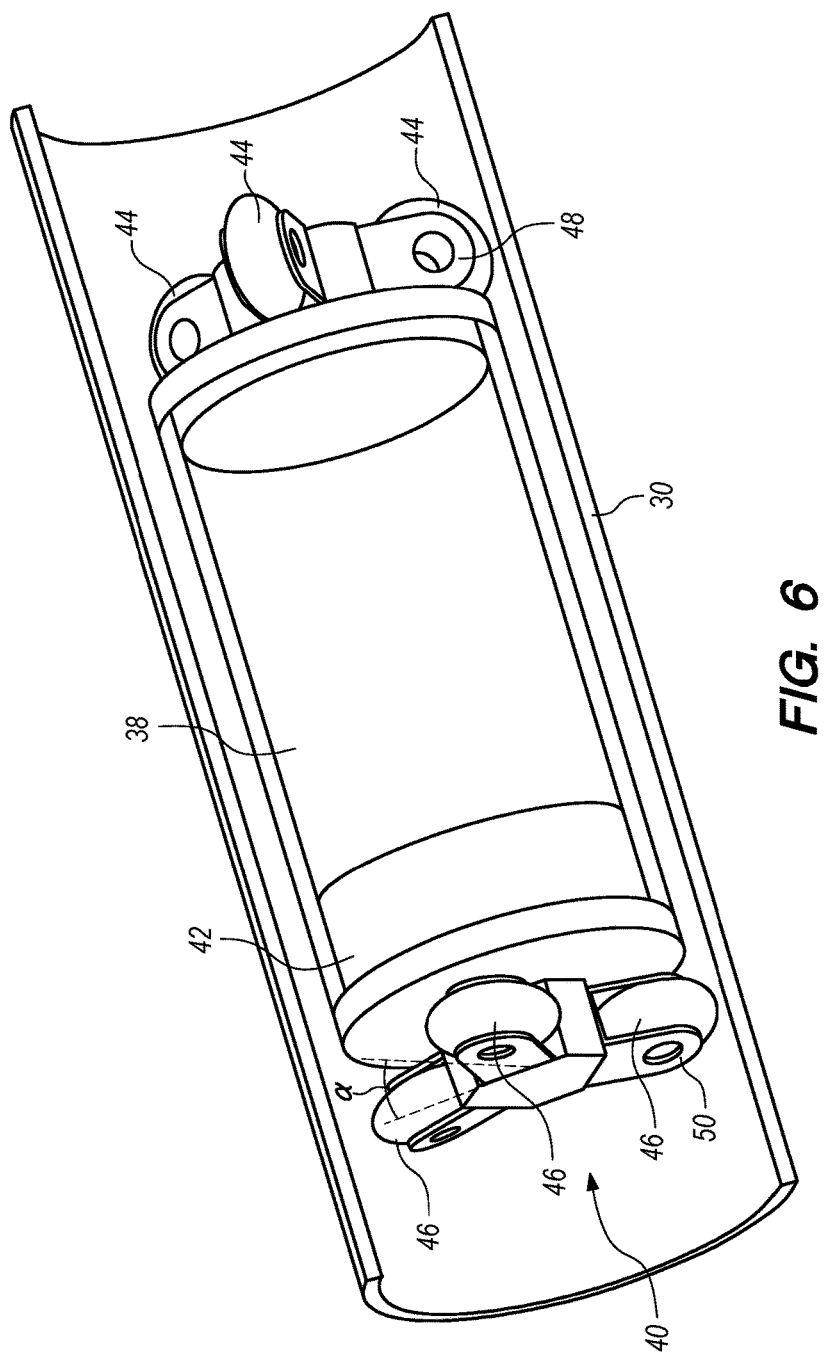
FIG. 6 is a perspective view of the product delivery system of the product vending and tube delivery system of the present invention utilizing a screw-propulsion canister.
Figure 7:
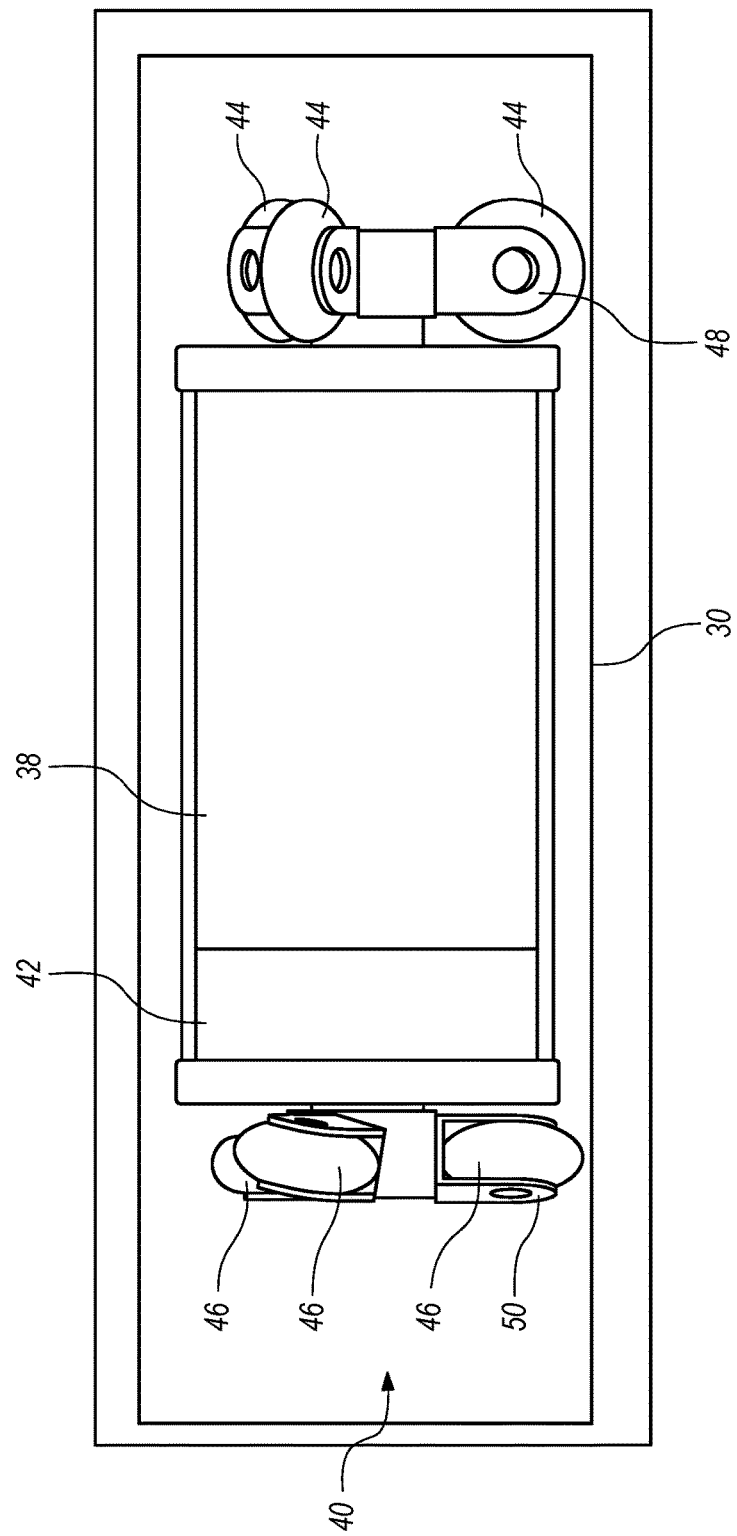
FIG. 7 is a side view of the screw-propulsion canister of the product vending and tube delivery system of the present invention.

In an alternative embodiment as shown in FIGS. 6-7, instead of utilizing a pneumatic tube system for delivering products 36, the product delivery system 14 is a non-pneumatic system that employs a screw-propulsion canister 38 inside the tube 30 for moving the products 36. The selector 26 deposits the product 36 into the canister 38. The canister preferably has a door at one end that is open when the product 36 is being deposited into the canister 38 and is closed when the canister moves through the tube 30. The canister 38 uses a rotating power head 40 to push or pull itself through the tube 30. A battery-powered motor 42 powers the power head 40 and preferably is positioned in an enclosure at one end of the canister 38. At the opposite end of the canister 38 from the motor 42 are rolling wheels 44 that are positioned parallel with and contact the inner surface of the tube 30. The wheels 44 are preferably rubber and are rotatably mounted in a platform 48 fixed to the end of the canister 38. These straight rolling wheels 44 are unpowered and serve to keep the canister 38 in place while the motor applies torque to the rotating power head 40. The wheels 44 are preferably positioned to roll lengthwise inside the tube 30. The power head 40 is made up of three rollers 46 mounted at an optimal angle $\alpha$ from the axis of rotation of the canister 38. For example, the optimal angle $\alpha$ in one embodiment is 10 degrees. However, it should be understood that the angle may vary depending on the speed of the motor, the torque of the motor, the desired speed of the canister in the tube, and the weight of the canister. The rollers 46 are preferably the same as the wheels 44 and are rotatably mounted in a platform 50 rotatably attached to the end of the canister 38. As the power head 40 rotates the three rollers 46 create a threading type contact with the tube 30, which causes the canister 38 to move along the length of the tube 30. The rollers 46 are preferably positioned to roll around the inside diameter of the tube 30. A slight change in the angle $\alpha$ of the three rollers 46 in relation to the power head 40 allows the effective ratio between the rotation of the platform 50/rollers 46 and the linear motion of the canister 38 to change, which allows for different motors to be used without requiring different wheel sizes or gearing. The greater the angle $\alpha$, the faster the canister moves for a particular motor speed. However, more power is required. An inefficient gear box is eliminated, which results in cost savings to the business using this invention.

As described above, once the selector 26 pulls the appropriate product 36 from the storage compartment, it moves either to the tube 30 corresponding to the consumer who purchased that product and deposits the product 36 into the canister 38 or directly into the tube 30. The product 36 is then delivered through the tube 30 to a tube receptacle 18 located near the purchasing consumer. As shown in FIG. 1, in an alternate embodiment, a single tube 30 receives the products 36 and the single receiving tube 30 then branches into multiple tubes 32. The multiple tubes each correspond to a different receptacle 18 associated with a different consumer. In either embodiment, the product or products 36 travels through the appropriate tube to the receptacle 18, where the product or products 36 can be picked up by the remote consumer.

Figure 5:
FIG. 5 is a front view of the consumer purchasing interface of the product vending and tube delivery system of the present invention.

Turning to FIGS. 4-5, the consumer purchasing interface 16 may be described. In one embodiment, the consumer purchasing interface 16 is a screen that displays the products available for purchase. The screen is coupled with a payment receiving device, such as a magnetic card reader or cash receiving device. Once the consumer selects products to purchase, the consumer inserts payment, which communicates with the selector 26 located at the product vending machine 12 to pull that product or products 36 (as described above) and deliver it to the appropriate tube 30, which ultimately delivers the product to that consumer. In one embodiment, the interface 16 is integrated into an existing user interface. For example, the present invention can be used at a gas station, with the receptacle 18 being placed near the gas pump 34 at the fuel island. The interface 16 is integrated into the gas station's existing interface. When the consumer inserts payment for fuel, the existing fuel interface may already ask a series of questions: "Debit or credit," "Would you like a car wash," etc. The interface 16 of the present invention is easily integrated into the fuel interface, and simply adds additional questions. For example, "Would you like a soda or snack?," etc. If the consumer selects "yes" then a categorized menu of available products is generated, from which the consumer picks a product. In an alternate embodiment the interface 16 is integrated into the receptacle 18.

The product receptacle 18 is located near the remote consumer, such that the product 36 can be delivered to the consumer. A number of receptacles 18 may be used in order to facilitate purchasing by multiple consumers, each receptacle 18 corresponding to a different consumer. For example, the invention 10 may be implemented at a gas station, although it is not limited to such use. The example system 10 implemented at a gas station may locate a receptacle 18 at each fuel island. In this non-limiting example, as the consumer is purchasing fuel at the fuel island, the system 10 is capable of delivering a product 36 from the vending machine 12 to the receptacle 18 corresponding to that remote consumer through the delivery system 14. The receptacle 18 is accessible by the consumer, and once the purchased product 36 reaches the receptacle 18, the consumer may remove that product 36 from the receptacle 18 and enjoy the product purchased. In one embodiment, the receptacle 18 is integrated with a purchasing interface 16 such that the remote consumer can select and purchase a product through the receptacle 18 itself. In another embodiment, the purchasing interface 16 is integrated into a separate component and the receptacle 18 is only necessary to receive the product 36.

In one embodiment, the system 10 is equipped with an electronic tracking system to allow the canister 38 to track its location within the product delivery system by reading identifiers positioned inside the tube 30. The electronic tracking system allows multiple canisters to travel independently of one another within the product delivery system.

Unless otherwise stated, all technical and scientific terms used herein have the same meaning as commonly understood by one of ordinary skill in the art to which this invention belongs. Although any systems and materials similar or equivalent to those described herein can also be used in the practice or testing of the present invention, a limited number of the exemplary systems and materials are described herein. It will be apparent to those skilled in the art that many more modifications are possible without departing from the inventive concepts herein. All terms used herein should be interpreted in the broadest possible manner consistent with the context. Any ranges expressed herein are intended to include all particular values within the stated range, as well as all sub-ranges that fall within the stated range.

The invention claimed is:

1. A tube vending system for delivering a vending product selected by a remote consumer, comprising:
   a. a product vending machine;
   b. a product receptacle positioned remotely from said product vending machine;
   c. a non-pneumatic product delivery system comprising a delivery tube extending a length between said product vending machine and said product receptacle, wherein said product delivery system comprises a first canister and a second canister, wherein each of said first canister and said second canister is a screw-propulsion canister, wherein each of said first canister and said second canister comprises a rotating power head and a plurality of straight rolling wheels, wherein said rotating power head comprises three rollers, wherein said first canister and said second canister are configured to simultaneously move inside said delivery tube along the length of the delivery tube, wherein said product delivery system is in communication with said product vending machine, wherein said product receptacle is operable to receive said product from said product delivery system; and
   d. a consumer purchasing interface, wherein said consumer purchasing interface is in communication with said product delivery system.

2. The system of claim 1, wherein said product vending machine comprises a product storage unit and a product selector.

3. The system of claim 2, wherein said product storage unit is refrigerated.

4. The system of claim 2, wherein said product storage unit comprises a plurality of product storage compartments organized into a plurality of rows and a plurality of columns.

5. The system of claim 2, wherein said product storage unit further comprises a rail system, wherein said product selector is moveable on said rail system.

6. The system of claim 2, wherein said product storage unit comprises said vending product.

7. The system of claim 6, wherein said product selector is operable to remove said vending product from said product storage unit.

8. The system of claim 6, wherein said product selector is operable to transport said vending product to said product delivery system.

9. The system of claim 6, wherein said consumer purchasing interface comprises a screen configured to permit selection of said vending product by said remote consumer.

10. The system of claim 1, wherein said consumer purchasing interface comprises a payment receiving device.

11. A method for delivering a vending product selected by a remote consumer using a tube vending system, said method comprising the steps of:
   a. selecting a vending product at a consumer purchasing interface, wherein said consumer purchasing interface is in communication with a non-pneumatic product delivery system comprising a delivery tube extending a length between a product vending machine and a product receptacle, wherein said product delivery system comprises a screw-propulsion canister operable for holding said vending product;
   b. communicating to said product vending machine a selection of said remote consumer;
   c. removing said vending product from said product vending machine;
   d. moving said vending product from said product vending machine into said screw-propulsion canister, wherein said canister comprises a rotating power head and a plurality of straight rolling wheels, wherein said rotating power head comprises three rollers; and
   e. delivering said vending product in said screw-propulsion canister to said product receptacle, wherein said product receptacle is remote from said product vending machine and is accessible by said remote consumer.

12. The method of claim 11, further comprising the step of said remote consumer paying for said vending product via a payment receiving device in communication with said consumer purchasing interface.

13. A tube vending system for delivering a vending product selected by a remote consumer, comprising:
   a. a product vending machine;
   b. a non-pneumatic product delivery system comprising a delivery tube, wherein said product delivery system is in communication with said product vending machine, wherein said product delivery system comprises a first canister operable for moving inside said delivery tube and a second canister operable for moving inside said delivery tube, wherein each of said first canister and said second canister is a screw-propulsion canister, wherein each of said first canister and said second canister comprises a rotating power head and a plurality of straight rolling wheels, wherein said rotating power head comprises three rollers;
   c. a consumer purchasing interface, wherein said consumer purchasing interface is in communication with said product delivery system;
   d. a product receptacle operable to receive said product from said product delivery system, wherein said product receptacle is remote from said product vending machine, wherein said delivery tube extends a length between said product vending machine and said product receptacle; and
   e. an electronic tracking system comprising a plurality of identifiers inside said delivery tube, wherein each of said first canister and said second canister is operable to read said plurality of identifiers.

* * * * *